Sept. 14, 1954      R. B. LIGHTFOOT      2,689,099
TRIANGULAR STABILIZER FOR ROTARY WING AIRCRAFT
Filed Sept. 20, 1951      3 Sheets-Sheet 1
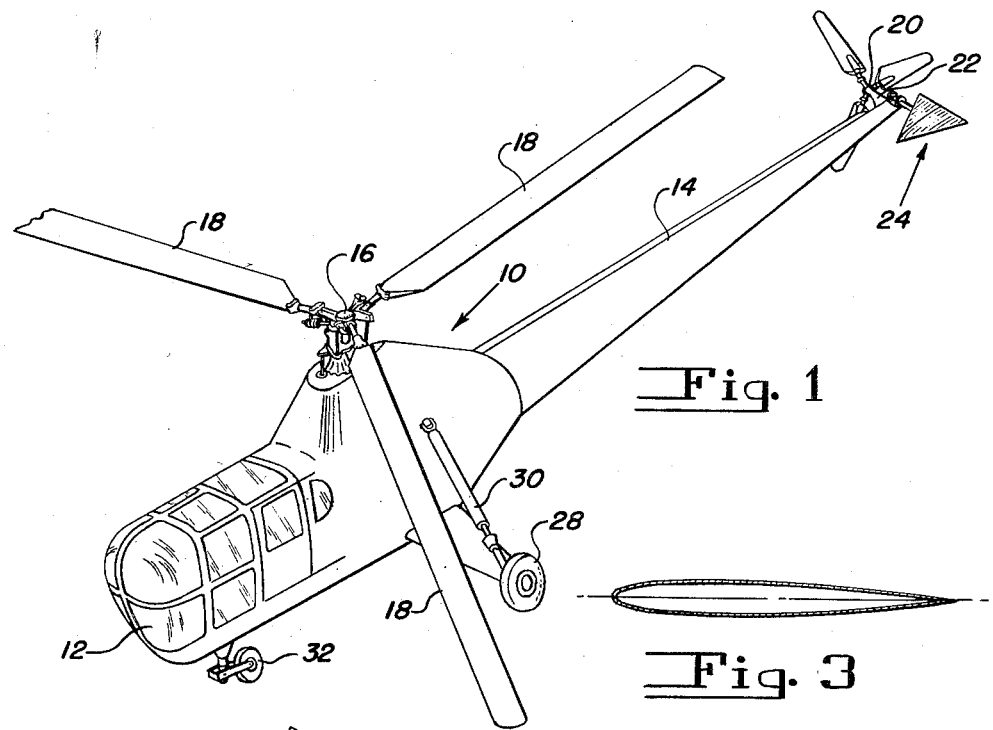
Fig. 1
Fig. 3
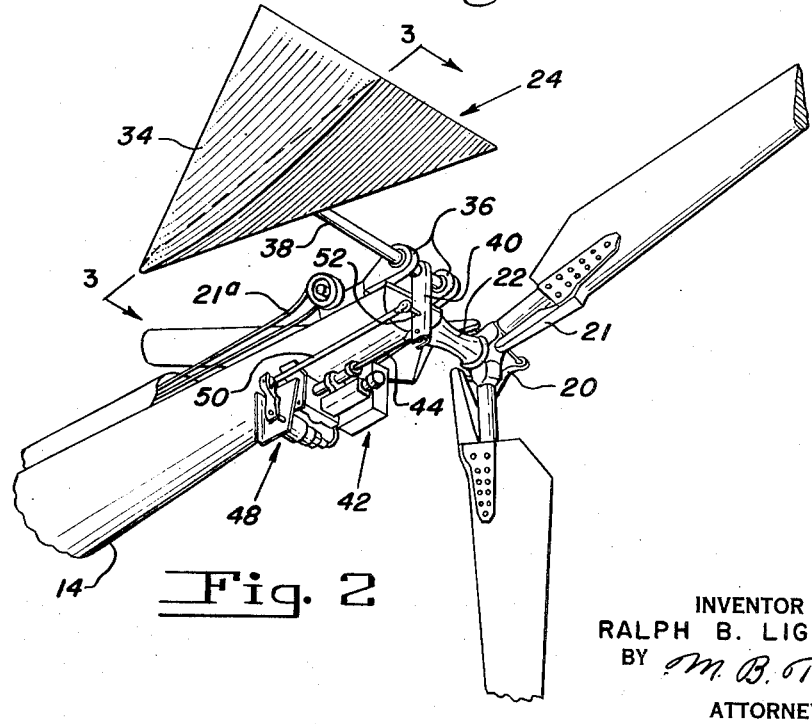
Fig. 2
INVENTOR
RALPH B. LIGHTFOOT
BY M. B. Tasker
ATTORNEY Sept. 14, 1954     R. B. LIGHTFOOT     2,689,099
TRIANGULAR STABILIZER FOR ROTARY WING AIRCRAFT
Filed Sept. 20, 1951     3 Sheets-Sheet 2

INVENTOR
RALPH B. LIGHTFOOT
BY
ATTORNEY

Patented Sept. 14, 1954

2,689,099

UNITED STATES PATENT OFFICE 2,689,099

TRIANGULAR STABILIZER FOR ROTARY WING AIRCRAFT

Ralph B. Lightfoot, Stratford, Conn., assignor to United Aircraft Corporation, East Hartford, Conn., a corporation of Delaware Application September 20, 1951, Serial No. 247,460

9 Claims. (Cl. 244—17.19)

1

This invention relates to helicopters and particularly to improved pilot adjusted trim stabilizers for helicopters.

Horizontal stabilizers similar to those used on the empennage of fixed wing aircraft have been installed on the tail cones of helicopters. While these stabilizers are satisfactory for fixed wing aircraft in which the angle of attack range may be plus or minus 15 degrees, they stall and become useless beyond this range in a helicopter wherein the angle of attack range may be as much as plus or minus 40 degrees.

It is an object of this invention to provide an improved stabilizer for helicopters which is insensitive to stall throughout a wide range of angle of attack of the ship.

More specifically, it is an object of the invention to provide a stabilizer for a helicopter having a plan form and an aspect ratio such that it will not stall throughout a range of angle of attack of plus or minus 40 degrees.

A further object of the invention is generally to improve the operation and control of helicopters.

These and other objects and advantages of the invention will be hereinafter pointed out in connection with a detailed example shown in the accompanying drawings.

In these drawings:

Fig. 1 is a perspective view of a helicopter equipped with the improved stabilizer.

Fig. 2 is an enlarged perspective view showing the stabilizer of Fig. 1 and the actuating mechanism for controlling it.

Fig. 3 is a longitudinal sectional view taken through the stabilizer of line 3—3 of Fig. 2.

Fig. 6 shows a modified construction of the improved stabilizer in which the stabilizer surfaces are fixed to the tail cone.

Fig. 7 shows a still further modified construction of stabilizer.

Fig. 8 illustrates a further modification of the stabilizer in which vertical fins are employed.

Fig. 9 shows still another modification of the stabilizer which is adapted to ships having folding tail rotors.

Figure 4:
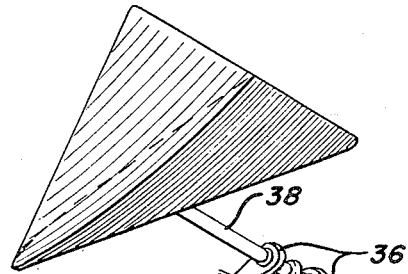
Fig. 4 is a diagrammatic view of the stabilizer and its control circuit.
Figure 4:
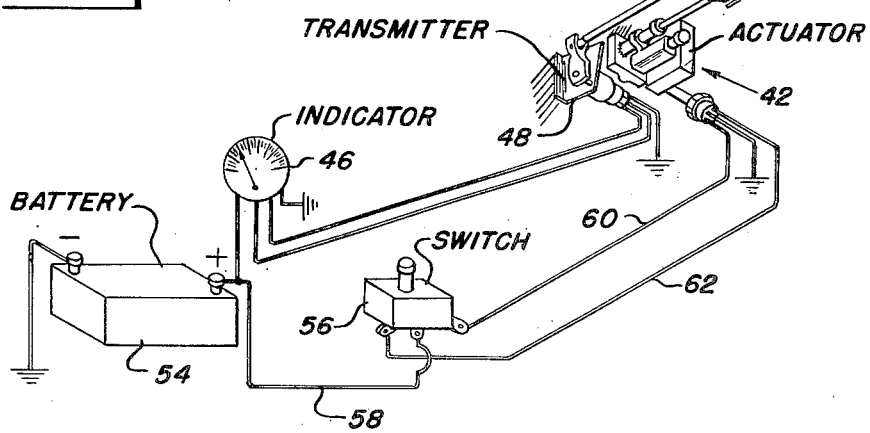
Figure 5:
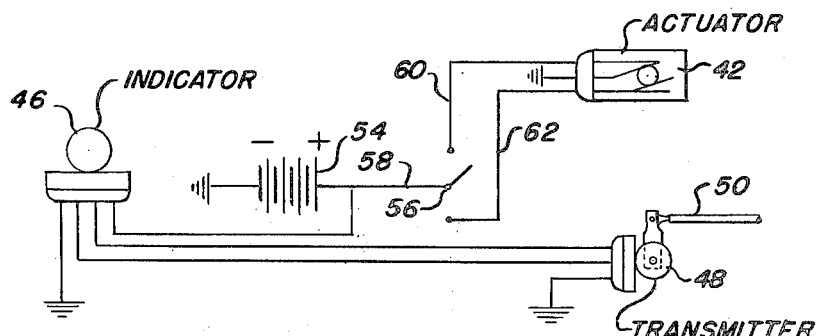
Fig. 5 is a wiring diagram of the mechanism shown in Fig. 4.

While the principles of the stabilizer of this invention are applicable to a wide variety of rotary wing aircraft, the invention is herein described in connection with a specific ship by way of example, namely, the Sikorsky S-51 helicopter.

2

Prior to the use of the improved dart stabilizer of this invention, the basic aircraft configuration except for a limited range of speeds and at low rotor speed, aft locations of the center of gravity and when travelling at high forward speed exhibited dynamic instability about all three axes and severe nose-high attitudes under power failure conditions. Although sufficient controllability and low frequency response made the dynamic instability tolerable, insufficient control was available to the pilot to cope with the latter situation although control would be regained shortly after the power failure. The low aspect ratio dart-shaped stabilizer of this invention completely corrected this difficulty since due to its plan form and its low aspect ratio this stabilizer is relatively insensitive to stall even at an angle of attack of the ship of as much as plus or minus 40 degrees. Consequently with the occurrence of a large angle of attack range attendant upon a power failure, the improved stabilizer continues its effectiveness and maintains the helicopter attitude with respect to the flight path. The pilot retains adequate control and the same stabilizing effects experienced under power flights continue throughout the autorotative regimes of flight.

The improved stabilizer also eliminates a dangerous reversal of pilot's stick control during transition from "power-on" to "power-off" condition when the pitching moments of the ship are changed by the addition of ambulance litter capsules, pontoons or other large bulging pieces of equipment which affect the pitching moments of the fuselage. During level flight, for example, with litters mounted on the sides of the ship, the pilot was formerly just able to handle the nose-up moment imparted to the ship by the litters but when, upon power failure, the ship went into autorotation and the rotor cone tipped back, the nose-up moment contributed by the litters was excessive and the pilot ran out of control, i. e., the stick hit the front stops.

The conditions are exactly opposite in level flight when pontoons instead of litters are mounted on this same ship. In this case, a nose-down moment is contributed to the ship by the pontoons causing a reversal in pilot's control, which is an unstable condition, since the pilot then is forced to steadily pull the stick back during acceleration instead of ahead.

These two extreme and opposite conditions require the use of a pilot adjusted trim stabilizer mounted near the end of the tail cone. The usual stabilizers of fixed wing aircraft were, however, wholly inadequate due to the wide range of angle of attack of the ship for the above conditions.

The present invention deals with an improved stabilizer which is able to contribute the desired amount of pitching moment compensation throughout the wide angle of attack range required without being excessively bulky or adversely affecting the flight characteristics of the ship.

As herein shown, the helicopter has a body generally indicated at 10 which contains a forward passenger and pilot compartment 12 and a rearwardly extending tail cone 14. A main lifting rotor 16 is mounted for rotation about an upright axis in the body 10 and has articulated blades 18 of which three are used in this ship. A tail rotor 20 mounted for rotation about a horizontal axis 22 is disposed wholly on one side of the extremity of the tail cone. This tail rotor is of the variable pitch type, each blade having a horn 21 for varying the pitch angle of the rotor blades by a usual control mechanism including cables 21a which extend forward into the pilot's compartment and are controlled by rudder pedals.

The improved stabilizer of the present invention generally indicated at 24 is preferably located on the opposite side of the tail cone from the tail rotor 20 and as herein shown is pivoted for movement about a horizontal axis which is located slightly above the axis 22 for the tail rotor but is generally parallel therewith.

The helicopter is supported on main landing gear 28 provided with the usual oleo struts 30 and on a forward nose wheel 32 which has the usual swivel mounting on the fuselage so that when the ship is resting on the ground the tail rotor and the stabilizer are located a safe distance above the ground.

The improved stabilizer of this invention as shown in Figs. 1 through 5 consists of a generally horizontal airfoil member 34 of generally isosceles triangular plan form having a very low aspect ratio of preferably between 1.3 to 2.5. Although the stabilizers of Figs. 1, 3 and 7 are shown with straight leading edges for ease of manufacture, better results could be obtained if the leading edges of the triangle were convex or bowed out in plan form. In the installation shown the neutral position of the airfoil 34 is set with the angle between the chordline of the stabilizer and the centerline of the tail cone at 12¾ degrees with a range of plus three degrees and minus 4 degrees from neutral. The stabilizer is mounted for this pivotal movement in a pair of rearwardly extending brackets 36 rigidly mounted on the extremity of the tail cone 14. The stabilizing airfoil 34 has an axle 38 to which it is rigidly fixed and which is journalled in the brackets 36. The axle 38 has fixed thereto a depending arm 40 to the lower end of which the servo motor mechanism, generally indicated at 42, is connected by an actuating rod 44. If desired, an indicator 46 may also be provided in the pilot's compartment to show him the position of the stabilizer. The current for the indicator is controlled by a transmitter generally indicated at 48 which is connected by means of a rod 50 with arm 40 at a point 52 intermediate the ends of the latter.

The servo motor and indicator mechanism, as shown diagrammatically in Fig. 4, includes a battery 54, a double throw switch 56, a servo motor actuator 42 which is in effect a reversible electric motor and the electrical transmitter 48 which actuates indicator 46. It will be evident that current from the battery 54 is supplied to the movable element of switch 56 through conductor 58 and through either conductor 60 or 62, depending upon the position of the switch, to actuator 42 to move the stabilizer in one direction or the other, the current flowing from the actuator back to the battery through grounded connections. Movement of the arm 40 by the servo actuator results in movement of the transmitter by means of the rod 50 to vary the current flow to the indicator proportionally to the extent of movement of the stabilizer in a well-known manner.

The stabilizer 24 is of airfoil configuration as will be evident from Fig. 3, herein being shown as substantially symmetrical about its chord axis. An airfoil of this type having a dart-shaped plan form in which the leading edges of the surface are swept back sharply to provide an aspect ratio between the range of 1.3 to 2.5 is capable of exerting the necessary pitching moments to provide the desired stability of the aircraft during the critical transition from powered flight to autorotative flight even under conditions of adverse pitching moments set up by external litter capsules and pontoons.

In Fig. 6 the dart-shaped stabilizer shown and described in Figs. 1 to 5 is shown in somewhat modified form in which the surface is longitudinally divided and the two complemental triangular plan form parts 64 thereof are rigidly attached to the tail cone 14 and are directed outwardly and downwardly from the axis of the tail cone. In this case the tail rotor 20 is mounted on a pylon 66 extending above the longtudinal axis of the tail cone. This arrangement improves both the longitudinal and directional and to some extent the vertical stability of the helicopter while providing stability throughout the wide range of angle of attack provided by the dart-shaped stabilizer of Figs. 1 to 5.

In Fig. 7 the surfaces 64 of Fig. 6 are shown mounted on downwardly and outwardly extended tubular members 68 which brings the surfaces fully below the tail cone 14 and out of turbulent flow resulting therefrom. The tubular supports 68 are pivoted axially similarly to the axle 38 of the Fig. 1 form to permit ground adjustment of these surfaces. Inclination of these surfaces in the manner indicated provides directional as well as longitudinal stabilizing forces.

In the Fig. 8 modification the dartlike stabilizer 24 of Figs. 1 to 5 is shown provided with upstanding and depending vertical fins 70 and 72 which may be desirable under certain conditions to provide added directional stability.

In Fig. 9 a dart-shaped stabilizer 74 is shown which is rigidly mounted on the pylon 80 and has a portion 76 cut away at its apex to clear the tail cone 14 when the pylon 80 and the attached stabilizer 74 are folded forward about their common axis 82.

As a result of the use of the dart-shaped low aspect ratio stabilizer of this invention, it has been made possible to provide satisfactory and stable operation of a helicopter throughout its wire range of angle of attack between "power-on" and "power-off" flight both with litter capsules which produce nose-up pitching moments and pontoons which produce nose-down pitching moments. The improved stabilizer enables these new results without in any way affecting the speed limitations of the aircraft. Further, the longitudinal static and dynamic stability of the helicopter is greatly improved to such an extent that when servo controls are provided for the ship, complete hands-off flight is possible even under most adverse atmospheric conditions.

The improved low aspect ratio stabilizer of this invention, because of its airfoil configuration and its triangular plan form, is able to maintain its lift, without stalling, through the wide range of angle of attack encountered in the flight of a helicopter during the transition from powered flight to autorotative flight—a condition not encountered in airplanes. Further the stabilizer of this invention is able to provide adequate control under these diverse flight conditions of a helicopter without adjustment by the pilot enabling the stabilizer to be rigidly attached to the tail cone and eliminating all the controls required by the usual adjustably mounted stabilizer.

The use of the improved stabilizer of this invention also eliminates the dangerous reversal of pilot's stick control during transition from "power-on" to "power-off" flight condition when the control of the ship would otherwise be changed by the addition of external equipment which affects the pitching moment of the ship.

While the invention has been described in connection with a specific ship which is now in use and various modifications thereof have been shown and described, it will be evident that the invention is not limited to the specific embodiments disclosed herein but that various other modifications are possible without departing from the scope of the invention.

I claim:

1. In a rotary wing aircraft having an elongated fuselage and a sustaining rotor at one end of said fuselage, a stabilizer having an aspect ratio of less than 3 and of generally triangular plan form and of airfoil configuration secured to said fuselage adjacent the other end of said fuselage, said stabilizer having its apex forwardly directed and having its surface generally symmetrical about a fore and aft line.

2. In a rotary wing aircraft having a fuselage terminating at one end in a tail cone, a main sustaining rotor rotatable about an upstanding axis, and a combined vertical and horizontal stabilizer of airfoil configuration rigidly secured to said tail cone outside the projected disc area of said rotor, said stabilizer having a generally triangular, low aspect ratio plan-form surface divided longitudinally at its mid-section into two triangular plan-form surfaces located on opposite sides of said tail cone and extending downwardly and outwardly therefrom, said two surfaces together having an aspect ratio of not more than 3 and being symmetrically disposed about a fore and aft line.

3. In a rotary wing aircraft, a body, a sustaining rotor positioned for rotation above said body, and a stabilizer secured to said body at a location removed from the axis of said rotor, said stabilizer comprising a generally triangular plan form surface of airfoil cross section having its apex forwardly directed and having its surface generally symmetrical about a fore and aft line.

4. In a rotary wing aircraft having a body, a sustaining rotor rotatable about an axis upstanding from said body and a stabilizer having an aspect ratio of not more than 3 and of generally triangular plan form and of airfoil configuration mounted on said body in spaced relation with respect to said rotor axis, said stabilizer having its apex forwardly directed and having its surface generally symmetrical about a fore and aft line.

5. In a rotary wing aircraft, a body, a sustaining rotor positioned for rotation above said body, and a stabilizer positioned on said body in spaced relation with respect to said rotor, said stabilizer comprising an airfoil having a generally triangular plan form of aspect ratio not more than 3 with its apex forwardly directed and its surface generally symmetrical about a fore and aft line.

6. A rotary wing aircraft as claimed in claim 1 in which the fuselage terminates in a tail cone and an anti-torque tail rotor is provided at one side of said tail cone which is rotatable about an axis transverse to the longitudinal axis of said cone and the triangular stabilizer is located on the opposite side of said cone from said tail rotor.

7. A rotary wing aircraft as claimed in claim 1 in which the fuselage has a rearwardly extending portion remote from the sustaining rotor and the stabilizer is divided along its line of symmetry into two acute angled plan form surfaces which are secured to the extended portion of the fuselage on opposite sides thereof along said line of division and which extend downwardly and outwardly from said fuselage.

8. A rotary wing aircraft as claimed in claim 1 in which a vertical fin is provided on the stabilizer in the vertical plane including the line of symmetry of the stabilizer.

9. A rotary wing aircraft as claimed in claim 1 in which the fuselage has a rearwardly extending portion remote from the rotor and in which a foldable tail rotor pylon is carried by said portion and the stabilizer is carried by the pylon and is foldable therewith.

References Cited in the file of this patent

UNITED STATES PATENTS

| Number | Name | Date |
|---|---|---|
| 1,106,428 | Verclaire | Aug. 11, 1914 |
| 2,424,882 | Gluhareff | July 29, 1947 |
| 2,551,067 | Stanley | May 1, 1951 |